2,947,727
CATALYTIC POLYMERIZATION PROCESS

Kenneth W. Bartz, Austin, Tex., assignor to Celanese Corporation of America, New York, N.Y., a corporation of Delaware No Drawing. Filed Oct. 21, 1957, Ser. No. 691,140

4 Claims. (Cl. 260—67)

This invention relates to polymeric materials and more particularly to a method for producing a tough, high molecular weight material by the polymerization of trioxane.

Trioxane is a cyclic trimer of formaldehyde having a six-membered heterocyclic ring consisting of alternating oxygen atoms and methylene groups. In pure state it melts at 64° C. and boils without decomposition at approximately 115° C.

It is known that trioxane may be polymerized in the presence of certain specific inorganic fluorides, such as antimony trifluoride, to produce a tough, high molecular weight polymer, known as polyoxymethylene, after a polymerization period ranging from one to seven days. It has been reported that the nature of the inorganic fluoride is quite critical and many metallic fluorides, such as sodium fluoride, calcium fluoride, lead fluoride and ferric fluoride show no catalytic activity.

It is an object of this invention to provide a new process for making a tough, high molecular material from trioxane utilizing catalytic materials previously not known to be effective. Other objects will appear hereafter.

The objects of this invention are accomplished by a process which comprises polymerizing trioxane in the presence of a catalyst comprising an alkane sulfonic acid, and preferably a lower alkane sulfonic acid having not more than five carbon atoms.

Preferably, the polymerization takes place in molten trioxane. However, the temperature of the reaction may vary from about 0° C. to substantially the boiling point and the trioxane may be in solid phase at the lower temperatures.

The catalyst should be present in the polymerization zone in amounts between about 0.001 and about 2.0 weight percent, based on the weight of trioxane in the polymerization zone. Preferably, amounts between about 0.50 and about 0.01 weight percent should be used.

The trioxane and the catalyst are preferably anhydrous or substantially anhydrous. Small amounts of moisture, such as may be present in commercial grade trioxane do not preclude the formation of an acceptable product. However, for best results, commercial trioxane should be dehydrated.

In one method of preparation, the trioxane is maintained as a molten body at a temperature between about 70° and about 80° C. A measured amount of catalyst is added with vigorous stirring. The desired polymer is produced within 24 hours or less.

If desired, a more even distribution of the catalyst into the body of molten trioxane may be achieved by dissolving the catalyst in a solvent, such as ether, and then rapidly dispersing the catalyst solution into the body of molten trioxane. The total amount of catalyst added in the solvent is within the range specified above. A complete description of this procedure may be found in application Serial No. 691,145, filed by Donald E. Hudgin and Frank M. Berardinelli on October 21, 1957.

Another advantageous procedure involves the polymerization wherein the trioxane is in solution in a solvent, such as diethyl ether. Catalyst is added in the proportion stated above, based on the weight of trioxane in solution. The polymer comes out of solution as it is formed. A complete description of this method of procedure may be found in said application Serial No. 691,145.

In still another advantageous procedure, the trioxane is suspended in an inert liquid such as normal decane which is at least partially a non-solvent therefor. Catalyst in the amount specified above is added and solid polymer is quickly formed in the suspended trioxane. A complete description of this method of procedure may be found in application Serial No. 691,142, filed by Donald E. Hudgin and Frank M. Berardinelli on October 21, 1957.

The polymer, after formation, is washed clean of monomer, if any, catalyst and solvent or suspension medium if any; when there is no solvent or suspension medium one or more water washes will generally suffice. Where a solvent or suspension medium is used, the polymer is generally washed first with aqueous ammonia or with an organic solvent, such as ether, and then finally washed with water.

The washed polymer may be compression molded at 180° C. for two minutes, particularly after stabilization with five weight percent of diphenylamine to produce tough molded objects.

EXAMPLE

In these runs a quantity of trioxane was melted and filtered under a slight vacuum. In each run 50 grams of molten trioxane was poured into a 50 ml. test tube equipped with a ground glass stopper, and the trioxane was allowed to solidify. Thereafter, 0.5 ml. of ethane sulfonic acid, dissolved in ether where indicated, was added, the tubes were secured and placed in a constant temperature bath maintained at 75° C. The tubes were fastened in such a manner to experience a slow rotary movement and were kept in the constant temperature bath for 30 hours. After cooling the tubes were opened, the polymer was removed with the aid of mechanical drills, was finally crushed and purified by agitation in boiling water, followed by filteration, ether wash and finally drying. The results were as follows:

Table

| Charge and Catalyst | Temperature Range, degrees | Time, hrs. | Result |
| --- | --- | --- | --- |
| 1. 42 g. of $C_3H_6O_3$ and 0.2 cc. of $C_2H_5SO_3H$. | 75 | 20 | Polymer obtained. |
| 2. 48 g. of $C_3H_6O_3$ and 0.25 cc. of $C_2H_5SO_3H$ in 10 cc. ether. | 75 | 20 | Do. |

It is to be understood that the foregoing detailed description is merely given by way of illustration and that many variations may be made therein without departing from the spirit of my invention.

Having described my invention, what I desire to secure by Letters Patent is:

1. A process for preparing a tough, high molecular weight material which comprises polymerizing trioxane under substantially anhydrous conditions at a temperature between 0° C. and the boiling point of trioxane in admixture with catalyst comprising an alkane sulfonic acid having up to 5 carbon atoms.

2. A process for preparing a tough, high molecular weight material which comprises polymerizing trioxane under substantially anhydrous conditions in the presence of between about 0.5 and about 0.01 weight percent, based on the weight of trioxane of a catalyst comprising an alkane sulfonic acid.

3. A process for preparing a tough, high molecular weight material which comprises polymerizing trioxane under substantially anhydrous conditions in admixture with the catalyst comprising ethane sulfonic acid.

4. A process for preparing a tough, high molecular weight material which comprises polymerizing molten trioxane under substantially anhydrous conditions in admixture with between about 0.50 and about 0.01 weight percent, based on the weight of trioxane, of a catalyst comprising ethane sulfonic acid.

References Cited in the file of this patent

UNITED STATES PATENTS

| | | |
|---|---|---|
| 2,304,080 | Frank | Dec. 8, 1942 |
| 2,768,994 | MacDonald | Oct. 30, 1956 |
| 2,795,571 | Schneider | June 11, 1957 |

OTHER REFERENCES

Walker: "Formaldehyde," ACS Monograph #120 (1953), chap. 7.